(12) United States Patent
Vanmoor

(10) Patent No.: US 6,257,195 B1
(45) Date of Patent: Jul. 10, 2001

(54) INTERNAL COMBUSTION ENGINE WITH SUBSTANTIALLY CONTINUOUS FUEL FEED AND POWER OUTPUT

(76) Inventor: Arthur Vanmoor, 22 SE. $4^{th}$ P.B.M. 219, Boca Raton, FL (US) 33432

( * ) Notice: Subject to any disclaimer, the term of this patent is extended or adjusted under 35 U.S.C. 154(b) by 0 days.

(21) Appl. No.: 09/503,665

(22) Filed: Feb. 14, 2000

(51) Int. Cl.$^7$ ...................................... F02B 53/00
(52) U.S. Cl. ................ 123/239; 418/175; 418/226
(58) Field of Search .................. 123/204, 224, 123/238, 239, 248; 415/175

(56) References Cited

U.S. PATENT DOCUMENTS

| | | |
|---|---|---|
| 53,915 | 4/1866 | Behrens . |
| 143,936 | 10/1873 | Spencer . |
| 1,298,140 * | 3/1919 | Workman ............................. 123/239 |
| 1,597,411 | 8/1926 | Kinney . |
| 2,189,728 * | 2/1940 | Daniels ................................ 418/175 |
| 2,586,842 | 2/1952 | McCallum . |
| 2,627,161 * | 2/1953 | Lindhagen et al. .................. 123/204 |
| 2,652,192 | 9/1953 | Chilton . |
| 2,691,482 | 10/1954 | Ungar . |
| 2,804,260 | 8/1957 | Nilsson et al. . |
| 2,896,409 * | 7/1959 | Heiman ................................ 123/225 |
| 2,975,963 | 3/1961 | Nilsson . |
| 3,424,373 | 1/1969 | Gardner . |
| 3,467,300 | 9/1969 | Schibbye . |
| 3,614,275 | 10/1971 | Eibsen . |
| 3,807,911 | 4/1974 | Caffrey . |
| 4,012,903 * | 3/1977 | Riedl ................................... 123/238 |
| 4,710,110 | 12/1987 | Paulus . |
| 5,829,957 | 11/1998 | Ozaki et al. . |

FOREIGN PATENT DOCUMENTS

| | | | |
|---|---|---|---|
| 111009 * | 11/1925 | (CH) | ................................... 123/224 |
| 214554 * | 7/1941 | (CH) | ................................... 123/224 |
| 1012669 * | 4/1952 | (FR) | ................................... 123/204 |
| 889246 * | 2/1962 | (GB) | ................................... 123/204 |
| 5-195808 * | 8/1993 | (JP) | ................................... 123/204 |

* cited by examiner

Primary Examiner—Michael Koczo
(74) Attorney, Agent, or Firm—Herbert l. Lerner; Laurence A. Greenberg; Werner H. Stemer

(57) ABSTRACT

The internal combustion engine allows charging with an air/fuel mixture into the combustion chamber while the combustion chamber is under combustion pressure and outputs power virtually continuously at the same time, i.e., the novel engine has an almost continuous fuel feed and, due to substantially continuous combustion, it also has an almost continuous power output. The fuel and/or air is injected by way of mutually intertwined worm spindles that form a fluidtight displacement system. The blades of the impeller system are almost flat, i.e., their attack angle relative to backpressure is close to perpendicular so that they will turn quite freely in the forward direction, but will not be turned backwards by a pressurized backflow. The impeller rotation that is introduced via the spindle shafts nevertheless leads to a volume displacement towards the chamber to be pressurized or to be subjected to equal pressure. The impeller system can be driven with variable speed, which translates proportionally in a variable pressure buildup.

5 Claims, 10 Drawing Sheets

INTERNAL COMBUSTION ENGINE WITH SUBSTANTIALLY CONTINUOUS FUEL FEED AND POWER OUTPUT

BACKGROUND OF THE INVENTION

1. Field of the Invention

The invention relates to internal combustion engines and, in particular, to rotary internal combustion engines and turbine engines.

2. Description of the Related Art

Internal combustion engines are generally characterized by discrete cycles of compression and combustion in time sequential order. In the case of the prevalent four stroke engine, the cycle is subdivided into to functional subdivisions defined by the fuel intake, the compression, the combustion, and the exhaust. In order to avoid pulsations in the power output, these cycles are simultaneously run with a time delay and chronological overlap on a number of combustion chambers that are housed within the same block.

The compression of the combustible fuel (i.e., fuel/air mixture) is typically effected by the same member that is also subject to the power transfer upon the combustion of the fuel. In the context of the Otto cycle, for example, the piston first reduces the volume of the combustion chamber to compress the fuel and then is ejected from the cylinder head by the combustion to drive the output shaft.

Similarly, most prior art rotary engines utilize the rotor to compress the fuel/air mixture in the combustion chamber (e.g. Wankel engine). The rotor is thereby radially asymmetric, it is mounted eccentrically relative to the rotor chamber, or the chamber is not circular. Examples of such engines are found in U.S. Pat. Nos. 4,075,981 to Durst, 3,301,233 to Dotto et al., and 3,782,110 to Kobayashi, respectively. An alternative design was recently proposed in U.S. Pat. No. 5,429,084 to Cherry et al. where the rotor and the chamber are radially symmetrical and the combustion chambers are instead formed laterally on either sides of the rotor. Several vanes move axially to close off the combustion chambers. The compression "stroke" is effected by the narrowing of the combustion chamber during the angular displacement of rotor relative to the rotor housing (the stator) and the reduction in chamber volume effected by the respective vane.

Various engines have been proposed with concentric rotors. Typically, such engines have a flat-cylindrical or doughnut-type housing and a central rotor that drives and output shaft or input shaft. For example, U.S. Pat. No. 2,390,880 to Harrold teaches a steam engine with a central rotor that carries two radial vanes. The vanes pass by two kidney-shaped turning valves.

U.S. Pat. No. 1,268,794 to Harris et al. teaches a convertible engine/pump. Turning valves mesh with teeth at the grooves of a periphery of the rotor and several pistons mesh with kidney-type indentation in two turning valves. The Harris et al. engine provides for two rotors and the pistons are offset between the two rotors so as to obtain a smooth pulse distribution in the timing of the explosions in the combustion chambers.

A system with separate combustion chamber and fuel pressurization was disclosed in British Patent Specification 265,659 to Bernhard. Fuel is pressurized in a compressor and the pressurized fuel is fed from the pump to the engine through a port assembly. A single piston and a single abutment define the combustion chamber.

The prior art engines have in common that fuel is cyclically combusted and the power output, as a result, is subject to pulsating output peaks. Sporadic air and fuel injection is more complicated and difficult to measure than continuous or nearly continuous injection. Most of the prior art engines, furthermore, contain a plurality of reciprocating parts which are subject to constant momentum changes and attendant energy losses. Even the rotary Wankel engine, for instance, is not a completely round system since its excentric rotor is subject to lateral displacement which causes further mechanical losses.

SUMMARY OF THE INVENTION

It is accordingly an object of the invention to provide an internal combustion engine, which overcomes the above-mentioned disadvantages of the heretofore-known devices and methods of this general type and which is further improved in terms of efficiency and strain on mechanical components constituting the engine and which allows essentially continuous power output with substantially continuous combustion.

With the foregoing and other objects in view there is provided, in accordance with the invention, a rotary internal combustion engine, comprising:

a toroidal body formed with an inner wall, two sidewalls, and a peripheral housing wall and defining a substantially toroidal chamber;

a blade attached to and projecting radially inward from the peripheral housing wall, the blade substantially sealing against the sidewalls and the inner wall;

a vane projecting substantially radially through the toroidal chamber and dividing the toroidal chamber into an exhaust chamber disposed on one side between the blade and the vane and a combustion chamber on another side between the vane and the blade;

a power output axle centrally disposed in the toroidal body, the peripheral wall being rigidly connected to the power output axle and the peripheral wall and the blade rotating about the axle in a given direction; and a fuel injection system for injecting fuel into the combustion chamber and an ignition system for igniting the fuel and forcing the blade away from the vane and thereby outputting power via the power output axle.

In accordance with an added feature of the invention, the vane is a rotary vane formed of a plate disposed to rotate about an axis substantially orthogonal to the power output axle, the plate having a cutout formed therein substantially corresponding to a shape of the blade, allowing the blade to periodically pass through the vane.

In accordance with another feature of the invention, an air injection system is disposed to inject air into the combustion chamber independently of the fuel. In a preferred embodiment, the air injection system includes an impeller disposed to pump air from an air intake pipe into the combustion chamber. The impeller is preferably a variable speed impeller.

The impeller system as disclosed provides for a substantially continuous air flow into the combustion chamber with a minimum in pulsations. Any backpressure from the combustion chamber into the air intake is safely blocked off by the walls of the double-impeller system. At least one continuous wall, preferably two complete walls, are at all times established by the rotating impeller blades and the relative alignment of the impellers.

In accordance with a further feature of the invention, the impeller is a double worm spindle impeller. The double worm spindle has two stacked, mutually inter-engaging impeller blade configurations which rotate about spaced-apart parallel axes.

In accordance with an additional feature of the invention, a mechanical linkage is disposed between the peripheral wall and the impeller for driving the impeller when the peripheral wall rotates about the power output axle.

In accordance with a concomitant feature of the invention, the toroidal body is formed with an exhaust opening just upstream of the vane in the direction of rotation of the blade.

The novel internal combustion engine is thus characterized with the injection of fuel and/or air by way of two or more intertwined worm spindles. The spindles are closed by a shaft and they are positioned and formed to define a substantially airtight or fluidtight displacement system.

One of the important features is that the blades of the impeller system are almost flat, i.e., their attack angle relative to backpressure is close to perpendicular so that they will not be turned by a pressurized backflow. The impeller rotation that is introduced via the spindle shafts, however, leads to a volume displacement towards the chamber to be pressurized. The impeller system can be driven with variable speed, which translates proportionally in a variable pressure buildup.

The novel combustion engine is further characterized with the virtually continuous injection of air and/or air-fuel mixture and the attendant, substantially continuous combustion reaction. The system may be adjusted so that the air and/or air-fuel mixture is injected at an increased pressure.

In an implementation of the invention, the rotary engine has a toroidal body with a peripheral wall that rotates about a central power output axle. A blade is attached to and projecting radially inward from the peripheral housing wall and seals against the inner walls of the hollow toroid. A rotary vane projects radially through the toroidal chamber and divides the chamber into an exhaust chamber disposed on one side between the blade and the vane and a combustion chamber on the opposite side between the vane and the blade. As the wall and the blade rotate about the axle, the combustion and exhaust chambers dynamically change. A fuel injection system injects fuel continuously into the combustion chamber and an ignition system ignites the fuel. The combustion expansion forces the blade away from the vane and thereby causes a power outputs via the rotation of the power output axle.

Other features which are considered as characteristic for the invention are set forth in the appended claims.

Although the invention is illustrated and described herein as embodied in a rotary internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
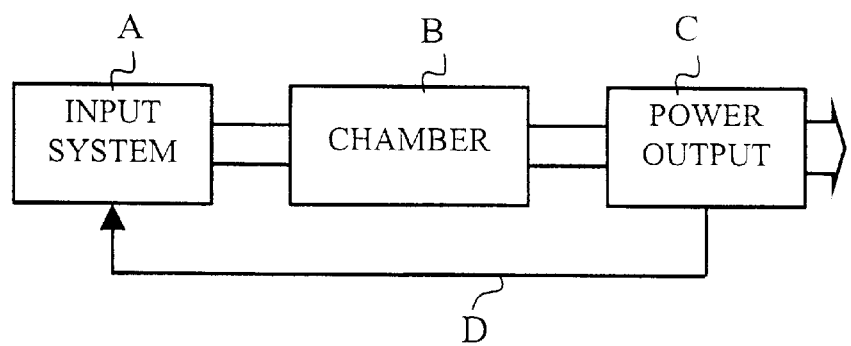
FIG. 1A is a schematic view of the novel internal combustion engine with three separate systems, namely an input system, a combustion chamber, and an output system.
Figure 1B:
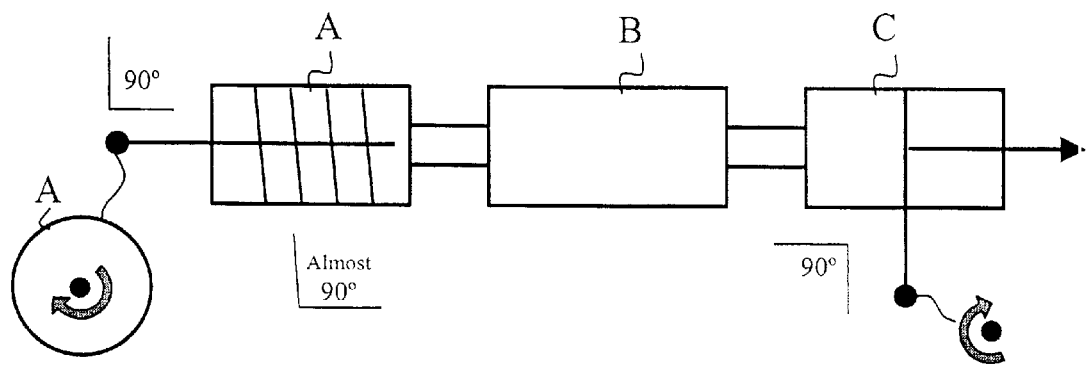
FIG. 1B is a slightly more schematic view of the novel internal combustion engine with the three system units.

The novel internal combustion engine presented herein is based on the principle of substantially continuous combustion. Such continuous combustion can be achieved only with the equally continuous injection of fuel (fuel-air mixture) into the combustion chamber and a continuous displacement mechanism. With reference to the schematic view of FIGS. 1A and 1B, the system consists of three separate parts, namely the input system/air displacement system A, a combustion chamber B, and a power output system C. The power output system is also a displacement system with the power output perpendicular to the blades of the input system. The power output of the output system C is partially fed back to the input system so as to drive the continuous air-fuel injection. The feedback is effected by a mechanical link D with optionally variable pressure generation, i.e., variable compression.

It is important for the system of the invention that, while the input system A is open towards the combustion chamber B, the same is not true for the reverse. The impeller injection system which will be described below satisfies this requirement.

An important feature of the novel system is the disposition and alignment of the air (or air-fuel) injection system, namely a rotary system which will close of the air injection intake pipe substantially air-tightly and which will not be subject to backpressure resistances. The main output vector, as shown at the output system C is substantially perpendicular to the alignment of the air injection system. Accordingly, the power output, which is parallel to the output force vector in the mechanical system, must necessarily be virtually exclusively through the power output system.

Figure 2:
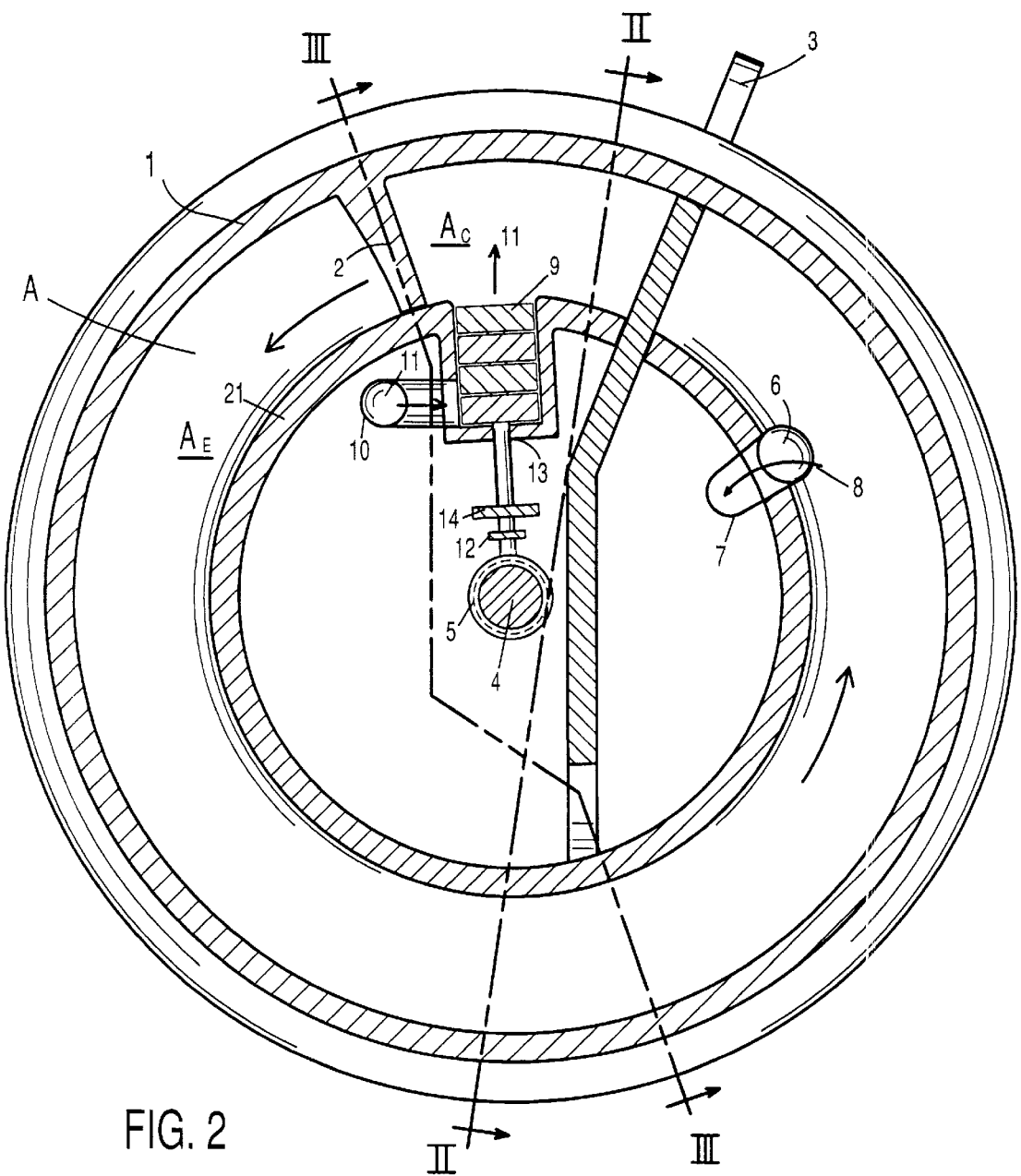
FIG. 2 is a cross-sectional view through an internal combustion engine according to the invention.

Referring now to an implementation of the invention and first, to FIG. 2 of the drawing, there is seen an engine which is shaped essentially as a toroid (circular doughnut) with a radial section that need not necessarily be circular. The toroidal body has a peripheral housing wall 1 to which there is attached a blade 2. While the exemplary engine is illustrated with a single blade 2, it will be understood that a multiple-blade system is equally feasible. Of the components illustrated in FIG. 1, only the wall 1 and the blade 2 rotate counter-clockwise about a rotational center axis C.

The other components are considered stationary in FIG. 1. The blade 2 and a vane 3 divide a chamber A into two partial chambers, namely a combustion chamber $A_C$ and an exhaust stroke chamber $A_E$. The combustion chamber $A_C$ trails the blade 2 and the exhaust chamber $A_E$ leads the blade 2. The volumes of the two chambers change dynamically while the blade 2 and the wall 1 rotate, and the two volumes complement each other to add to the full volume of the chamber A, i.e. $V_A = V_{AC} + V_{AE}$. The volumes taken up by the blade 2 and the vane 3 are thereby considered negligible.

The wall 1 and the blade 2 rotate about the central axis defined by a center axle 4. The axle 4, which represents the output member of the engine, is supported in bearings 5. As the blade rotates counter-clockwise, the volume of the exhaust chamber $A_E$ decreases and its gases are exhausted through an opening 6 that leads into an exhaust duct 7. The exhaust gas flow is indicated with an arrow 8. At the same time, the chamber $A_C$ expands in volume and the necessary air is injected by an air impeller 9. The air is aspirated by the impeller 9 through an intake duct 10. The air flow is indicated by arrows 11. The impeller 9 is advantageously driven such that more air volume is injected than is required to make up for the volume expansion of the chamber $A_C$. This results in a greater pressure in the chamber $A_C$ than ambient pressure. It will become clear from the following description that the speed of the impeller 9 may be adjusted so as to also adjust the compression in the combustion chamber $A_C$.

The impeller system 9 is rotatably supported about a radial axis (relative to the engine housing) in a rotary bearing 12 and a rotary bearing 13. The impeller shafts are driven via a rotary gear 14. The impeller 9 of FIG. 1 is a flat blade system with eight blades. Two types of impeller configurations are possible according to the invention, depending on the specific requirements. First, inclined blades may be provided in the form of a corkscrew so that the rotation of the impeller causes air flow to be pushed vertically upward. Second, the impeller blades may be flat blades (i.e., orthogonal to the rotary axis). In that case, the impeller system is a timed gate creating temporary openings and timed chambers within the impeller duct. Any increased pressure inside the chamber $A_C$ is prevented from causing a backflow towards the air duct 10 because at least two complete, continuous walls are at any time formed between the air duct 10 and the combustion chamber $A_C$. Inflow air which is subject to increased pressure (entering the engine at 10) but not to pulsations will be forced through the impeller system 9 as the impellers 9A and 9B rotate. In the preferred embodiment of the invention, the air is pressurized in an external compressor and it is fed through the "flat" impeller blade system into the combustion chamber $A_C$.

With reference to FIG. 2, the vane 3 is rotatably supported on an axle. The vane 3 is disposed and shaped so as to block the entire chamber A a long a radial plane. The vane 3 is formed with a cutout 16 which allows the blade 2 to pass through. The rotation of the vane 3 must be exactly timed in accordance with the rotation of the blade 2. In the preferred embodiment, the wall 1 and the vane 3 are connected through a mechanical linkage which is adjusted to assure the proper timing. One possible such linkage is a spindle drive which connects the axle 4 to the vane 3 by way of a spindle that meshes with a tooth profile formed on the vane 3.

Figure 3A:
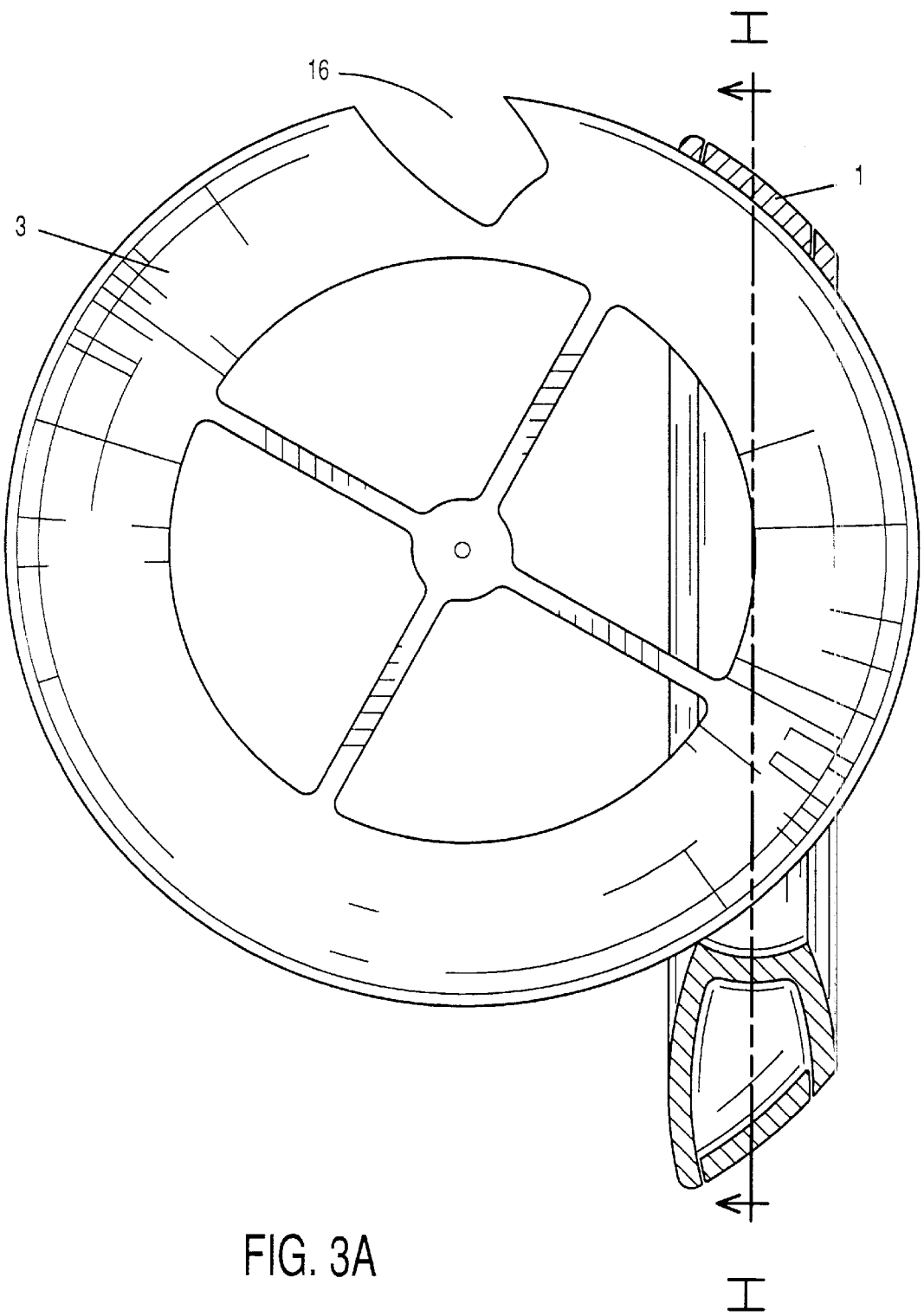
FIG. 3A is a partial axial section taken along the line II—II in FIG. 1.
Figure 3B:
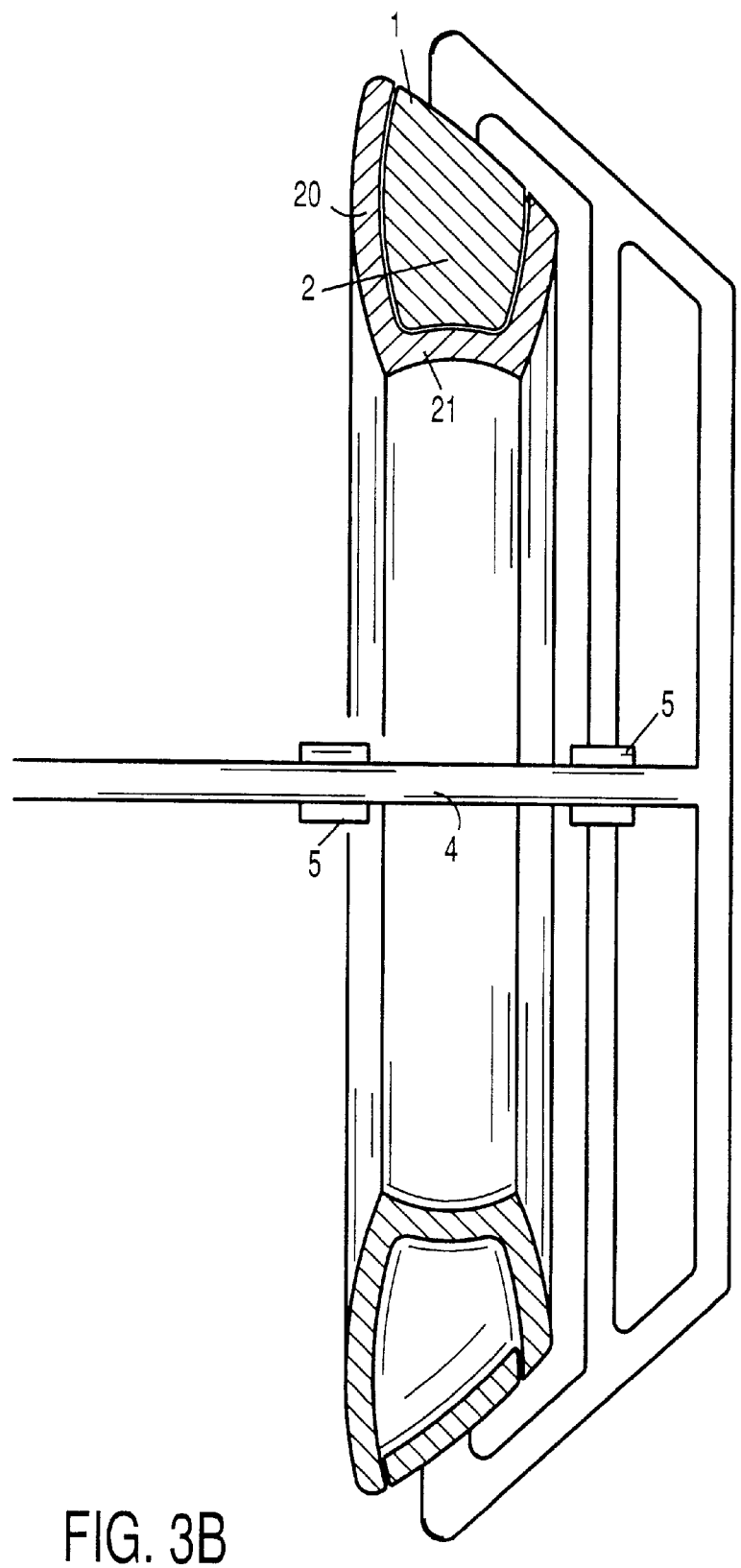
FIG. 3B is a partial diametrical section taken along the line III—III in FIG. 1.

With reference to FIGS. 3A and 3B, the peripheral wall 1 is attached with bracket links to the center axle 4, which is rotatably supported in the rotary bearings 5. The bracket links 19 may be two, three, or four rods which branch out from the center axle 4 in rotational symmetry. Various other numbers of rods, including a single, non-symmetrical rod, may be provided or, for that matter, any type of connection so as to assure the proper connection between the wall 1 and the center axle 4. The bulge of the links 19 is necessitated by and adapted to the rotary valve 3. FIGS. 3A and 3B shows an alternative cross-section of the doughnut housing and, accordingly, the blade 2. Here, the volume of the chamber A is substantially increased as compared to the chamber shown in FIG. 2. On the other hand, it is possible to maintain the same volume as in the embodiment of FIG. 2, by moving the bottom wall 21 closer to the rotating wall 1. This shortens the height of the side walls 20 and of the blade 2, as well as the radius of the vane 3.

Figure 4:
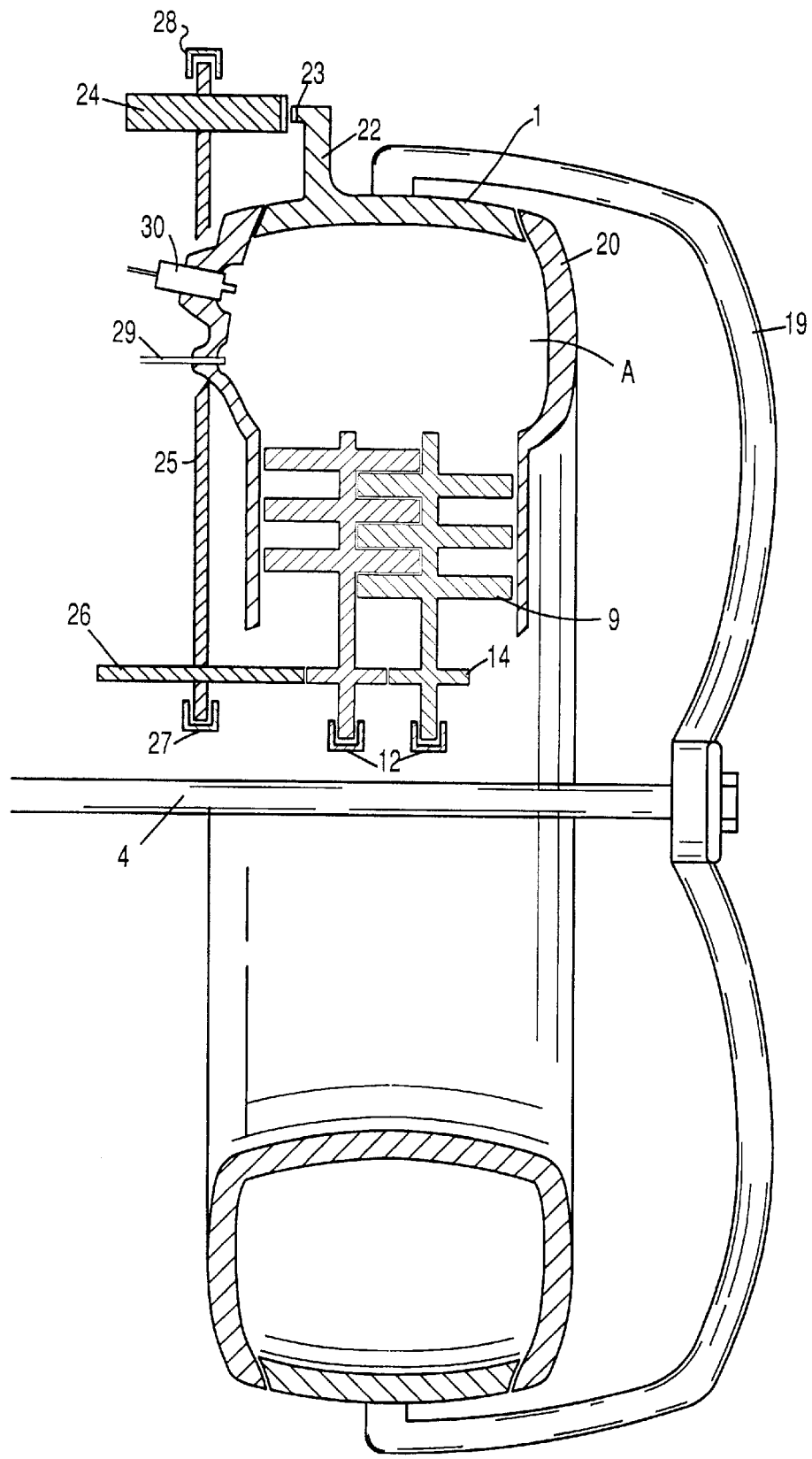
FIG. 4 is a partial sectional, diagrammatic view of the internal combustion engine in an alternative embodiment of the combustion chamber block and a second embodiment of the air impeller system.

With reference to FIG. 4, the impeller 9 may be driven via a mechanical linkage that is coupled to the wall 1. For that purpose, the wall 1 carries a flange 22 which is provided with gear teeth 23. A gear wheel 24 meshes with the teeth 23. The gear wheel 24 is rigidly connected to a rod 25 which, at the opposite side, carries another gear wheel 26. The rod 25 is rotatably supported in bearings 27 and 28. The wheel 26 drives the impeller 9 as it meshes with the wheel 14, either directly or via the intermediary of one or more transmission gears. Fuel is injected at a nozzle 29 and the combustible mixture in the chamber $A_C$ is ignited by a spark plug 30. The spark plug 30 of the preferred embodiment is one of several plugs 30 that are strategically disposed throughout the chamber A and which may be fired either simultaneously or sequentially.

Figure 5:
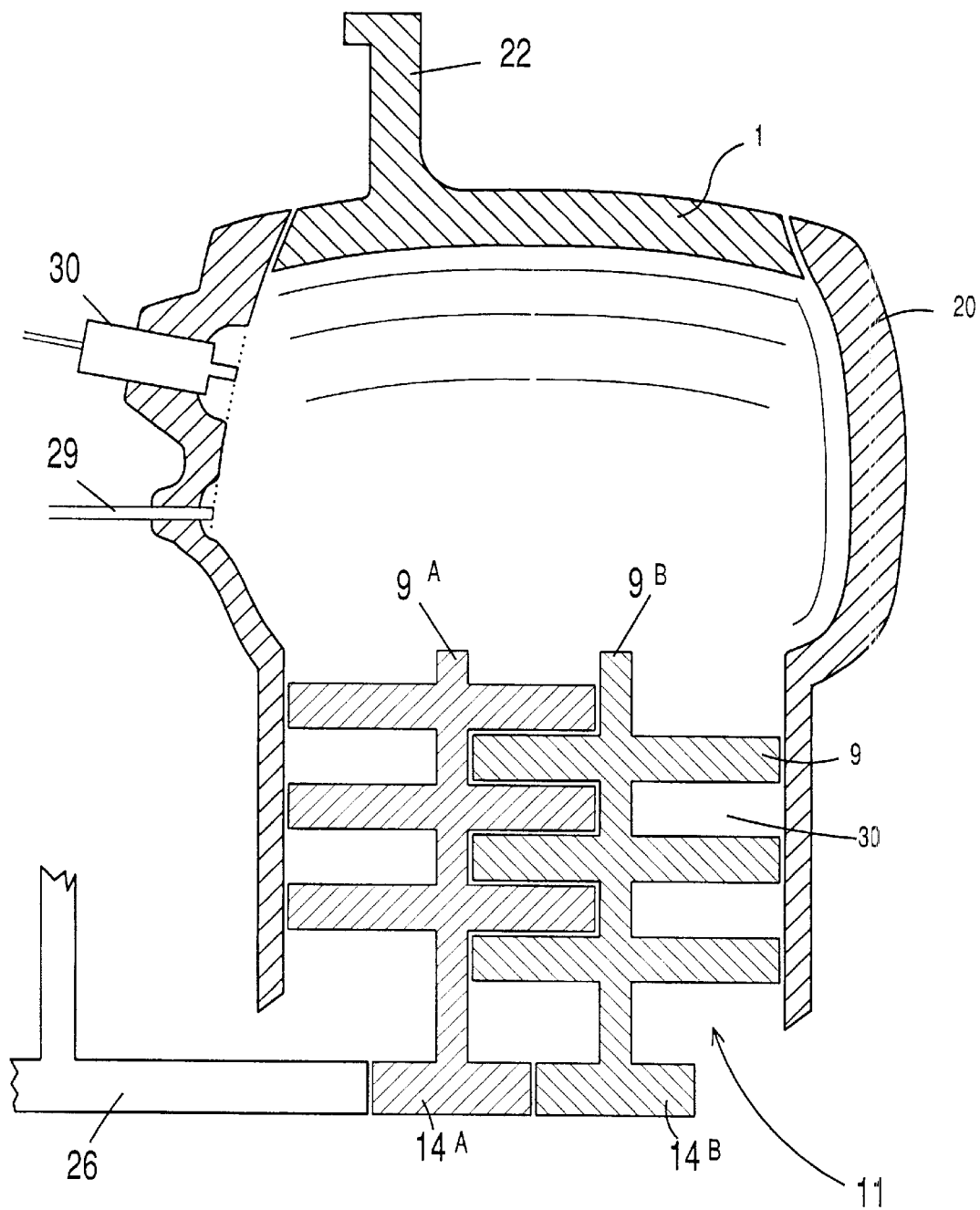
FIG. 5 is a partial enlarged view of the impeller embodiment of FIG. 4.

With reference to FIG. 5, there is shown a double impeller system, with a first impeller 9A driven by a first gear 14A and a second impeller 9B driven by a second gear 14B. The second impeller embodiment is a positive displacement system and, at the same time, a back-pressure membrane. As the ribbed impellers rotate, the air flow 11 is "packaged" into chamber 30 formed between the impeller axle 31, the wall 20, and the blades 9B. Following the helical path of the chamber 30, it is closed off by the blade 9A of the adjacent impeller structure. Depending on the rotational speed of the impeller system and the size of the chambers 30, the impellers 9A and 9B form a pressure pump with positive displacement towards the chamber $A_C$. The air flow 11 is at a lesser pressure than in the chamber $A_C$, unless, of course, the wall 1 and the blade 2 are driven by the shaft 4. As the blades 9A and 9B of the impeller rotate, various vertically stacked chambers are opened and closed so that it will result in a positive flow from the bottom into the chamber $A_C$. At the same time, any pulsations and explosions due to the combustion of fuel in the chamber $A_C$ will be prevented from flowing back into the intake pipe 10. In other words, the impeller pump is always closed with regard to a direct backflow of the fluid out of the combustion chamber $A_C$ into the intake pipe 10.

Any combination of the various impeller systems may be provided. For instance, the combustion chamber may be pressurized solely by the rotating double worm spindles. Alternatively, the double impeller system may be provided only as a variable wall (with flat plates) and the necessary pressurization may be entirely external to the engine as shown. By combining the two embodiments, however, it is possible to provide for light pressurization from outside the intake pipe 10 and then final pressurization by the double worm impeller.

Figure 6:
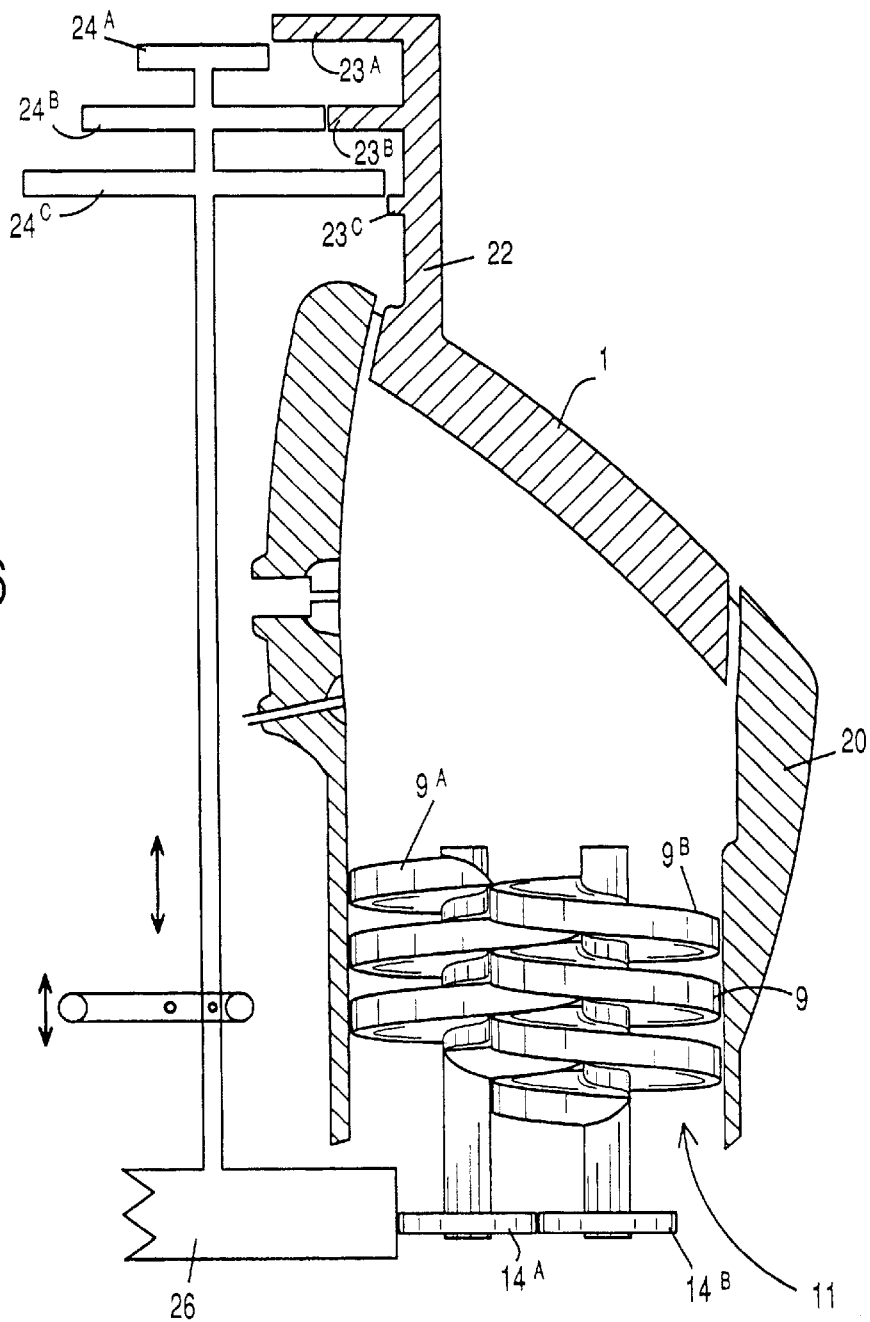
FIG. 6 is a partial view of the second impeller embodiment with a three-stage variable drive system.

FIG. 6 shows a variable speed drive of the impellers 9A and 9B. The toothed rack 23 is formed with three tracks 23A, 23B, and 23C. The gear wheel 24 has three different gear diameters, namely 24A, 24B, and 24C. The speed of the impeller system is thus variable. It should be understood that the illustrated variable gear system is highly diagrammatic and that any type of speed control may be implemented for the impeller system.

Figure 7:
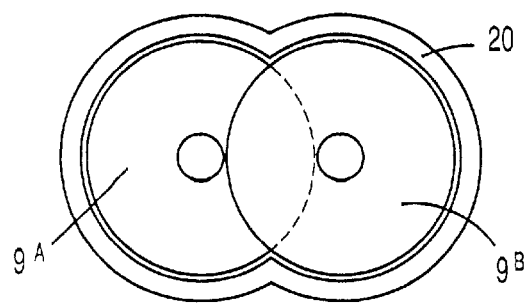
FIG. 7 is a top plan view onto the impeller blades and the housing of FIG. 6.

FIG. 7 is an axial plan view of the impeller system showing the engagement or meshing of the two blades 9A and 9B and the tight placement of the impeller blades inside the walls 20. The positive displacement force of the impeller system is thus only slightly impaired by backflow and leakage between the impeller blades 9A, 9B and the walls 20 and, negligibly, between the axle 31 and the adjacent blade 9A or 9B.

Figure 8:
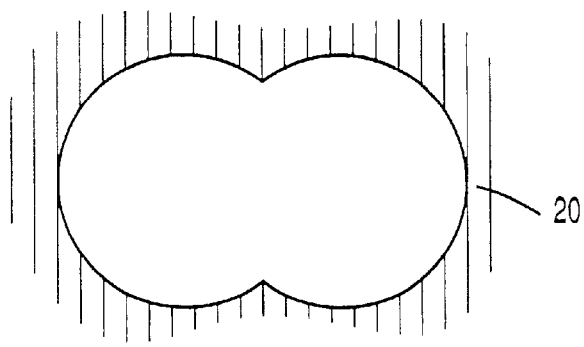
FIG. 8 is a plan view of the housing.
Figure 9:
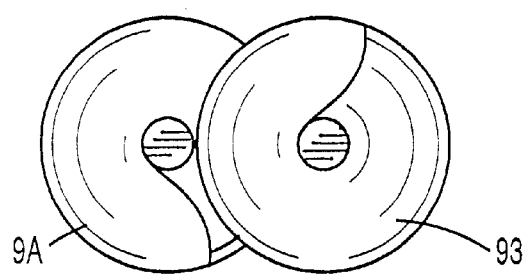
FIG. 9 is a plan view onto the impeller blades.

With reference to FIGS. 8 and 9, the housing of the positive displacement system is defined by walls 20 with rotationally symmetrical portions. In the illustrated embodiment with the two interengaging impellers, the housing has two intersecting circular arches that essentially correspond to the periphery of the blades 9A and 9B in their engagement position. A width D of the housing opening in which the impeller spindles are rotatably disposed corresponds to a diameter of the impeller blades 9A, 9B minus the overlap O. The overlap O, in turn, corresponds essentially to the rifling depth of the impellers, i.e., the difference in the radius of the blades 9A, 9B and the radius of the shaft 31. The width D may also be expressed as the sum of two times the diameter d of the shaft 31 plus two times the rifling depth of the impellers.

Figure 10:
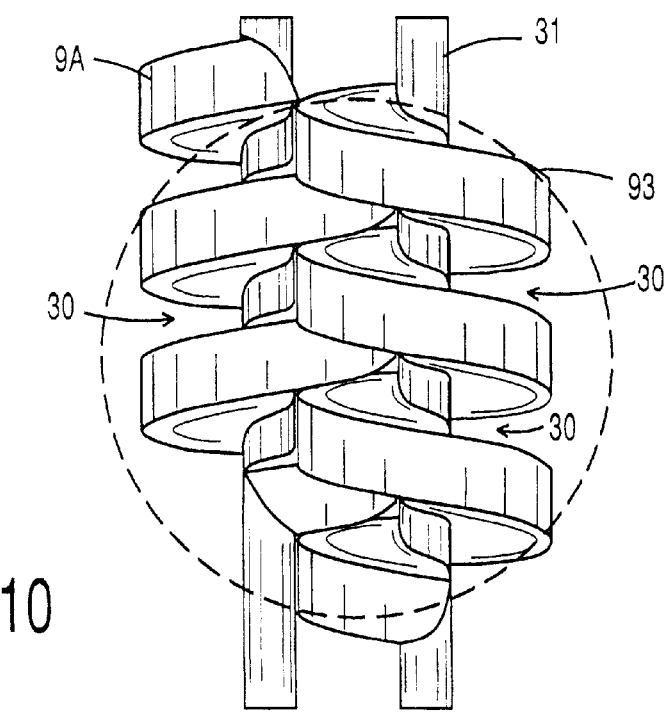
FIG. 10 is a side view of two mutually interengaging blade structures.

As seen in FIGS. 9 and 10, the blades or helical rifling of the blades is offset by approximately 180° so as to distribute the pumping discharge of each of the chambers 30 into the chamber $A_C$. In other words, it is advantageous for the chambers 30 to reach the top position at which they empty into the chamber $A_C$ alternatingly. In the case of two blades, the offset should thereby be in the neighborhood of 180°.

If three or more impeller spindles are used, the housing 20 requires a corresponding modification and, advantageously, the rotary offset of the impeller rifling may be distributed accordingly by 360°/n, where n is the number of impeller spindles.

Figure 11:
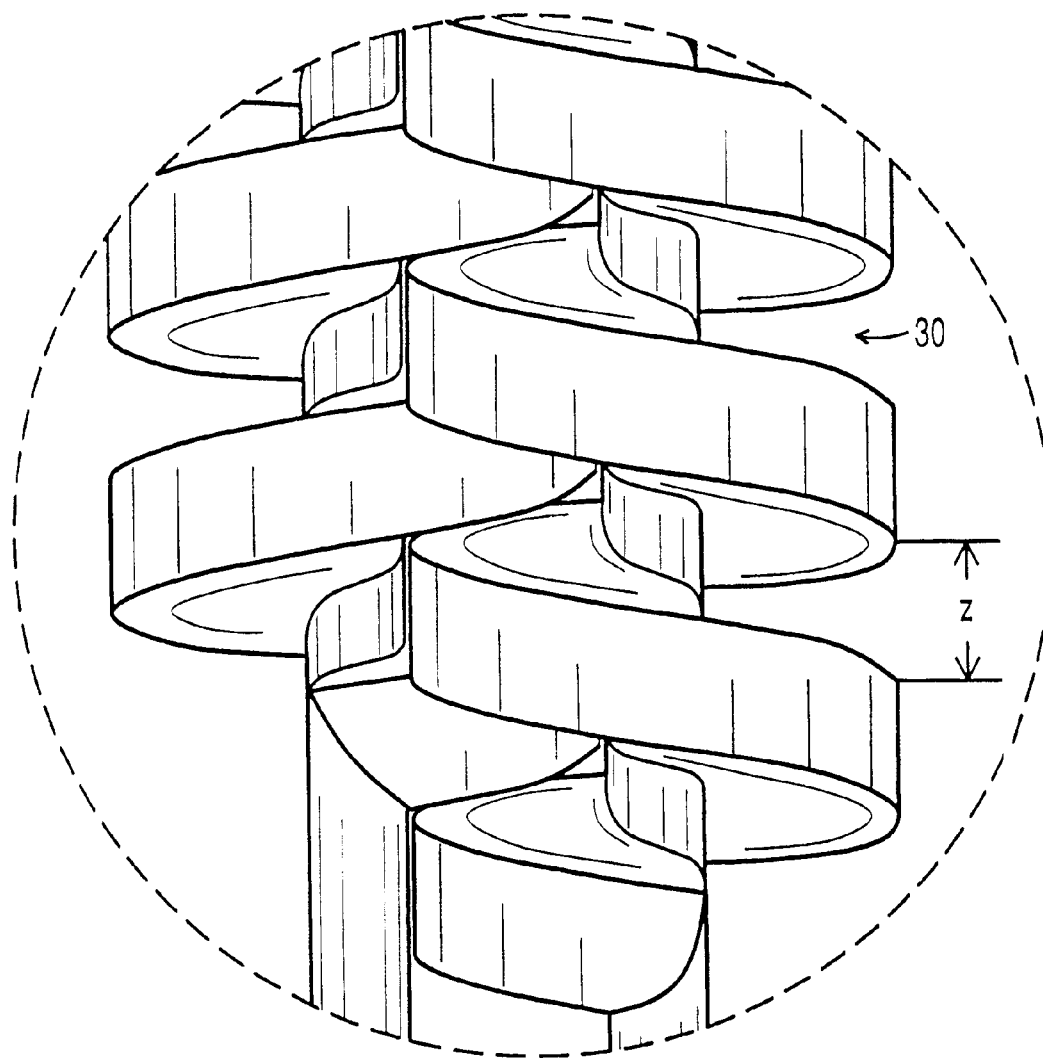
FIG. 11 is an enlarged view of the detail indicated in FIG. 10.

The volume of the chambers 30 and the rotational speed of the impellers defines the pump pressure and the volume displacement per time of the impeller injection. With reference to FIG. 11, the volume of each chamber 30 corresponds approximately to the double integral of the differential rotary angle dθ taken through 360° and the differential radius dr taken from the radius r of the shaft 30 to the radius R of the impeller blade 9A, 9B, multiplied with the blade spacing z, minus the volume portion of the adjacent blade that engages into the space in the center between the two spindles.

Figure 12:
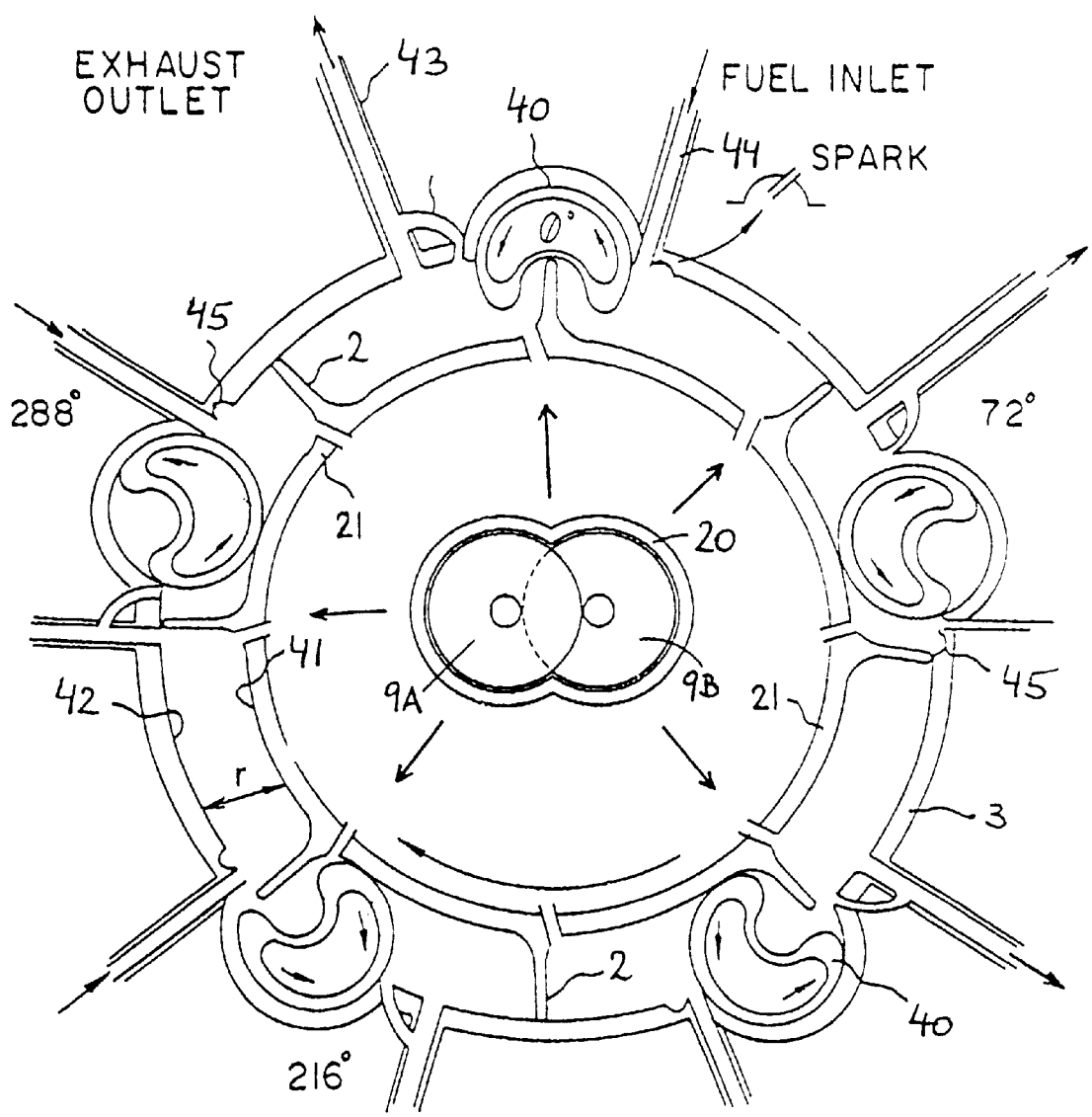
FIG. 12 is a diagrammatic sectional view of the rotary engine in an alternative embodiment.

Referring now to FIG. 12, there is illustrated a variation of the engine concept as described above. The internal combustion engine of FIG. 12 has a central air injector which injects into the center chamber of the engine body. The housing 20 of the impeller is attached to the stationary parts of the engine. Here, the rotating vanes 2 are attached to an inner core that rotates about a central axle. The exemplary embodiment of FIG. 3 is essentially a symbiotic combination of the engine described in my earlier U.S. Pat. No. 6,003,486, issued Dec. 21, 1999, the disclosure of which is herewith incorporated by reference. The individual combustion chambers are defined between kidney-shaped turning valves 40, a respective blade 2, a rotating inner wall 41, and a stationary outer wall 42. Exhaust air (exhaust gas) is exhausted at exhaust outlets 43 and the fuel is injected at fuel inlets 44. Alternatively, the fuel may also be injected in the form of a fuel mixture by the impellers 9A, 9B. The mixture is ignited at corresponding spark igniters 45 which are strategically placed downstream of each of the turning valves 40.

I claim:

1. A rotary internal combustion engine, comprising:
   a toroidal body formed with an inner wall, two sidewalls, and a peripheral housing wall and defining a substantially toroidal chamber;
   a blade attached to and projecting radially inward from said peripheral housing wall, said blade having a shape adapted to substantially seal against said sidewalls and said inner wall;
   a power output axle centrally disposed in said toroidal body, said peripheral wall being rigidly connected to said power output axle and said peripheral wall and said blade rotating about said axle in a given direction;
   a rotary vane disposed to rotate about an axis substantially orthogonal to said power output axle and projecting substantially radially through said toroidal chamber, said rotary vane being formed as a plate dividing said toroidal chamber into an exhaust chamber disposed on one side between said blade and said vane and a combustion chamber on another side between said vane and said blade;
   said plate having a cutout formed therein substantially corresponding to a shape of said blade, allowing said blade to periodically pass through said vane; and
   a fuel injection system for injecting fuel into said combustion chamber during an ongoing combustion in said combustion chamber and an ignition system for igniting said fuel and forcing said blade away from said vane and thereby outputting power via said power output axle.

2. The internal combustion engine according to claim 1, wherein said toroidal body is formed with an exhaust opening just upstream of said vane in the direction of rotation of said blade.

3. A rotary internal combustion engine, comprising:
   a toroidal body formed with an inner wall, two sidewalls, and a peripheral housing wall and defining a substantially toroidal chamber;
   a blade attached to and projecting radially inward from said peripheral housing wall, said blade having a shape adapted to substantially seal against said sidewalls and said inner wall;
   a power output axle centrally disposed in said toroidal body, said peripheral wall being rigidly connected to said power output axle and said peripheral wall and said blade rotating about said axle in a given direction;
   a rotary vane disposed to rotate about an axis substantially orthogonal to said power output axle and projecting substantially radially through said toroidal chamber, said rotary vane being formed as a plate dividing said toroidal chamber into an exhaust chamber disposed on one side between said blade and said vane and a combustion chamber on another side between said vane and said blade;
   said plate having a cutout formed therein substantially corresponding to a shape of said blade, allowing said blade to periodically pass through said vane;
   a fuel injection system for injecting fuel into said combustion chamber during an ongoing combustion in said combustion chamber and an ignition system for igniting said fuel and forcing said blade away from said vane and thereby outputting power via said power output axle; and
   an air injection system disposed to inject air into said combustion chamber independently of said fuel, said air injection system including a double helix spindle impeller disposed to pump air from an air intake pipe into said combustion chamber.

4. The internal combustion engine according to claim 3, wherein said impeller is a variable speed impeller.

5. The internal combustion engine according to claim 3, which comprises a mechanical linkage disposed between said peripheral wall and said impeller for driving said impeller when said peripheral wall rotates about said power output axle.

* * * * *